United States Patent
Cao et al.

(10) Patent No.: US 9,166,872 B2
(45) Date of Patent: Oct. 20, 2015

(54) METHOD AND NETWORK DEVICE FOR DETECTING IP ADDRESS CONFLICT

(71) Applicant: Huawei Technologies Co., Ltd., Shenzhen, Guangdong (CN)

(72) Inventors: Zhen Cao, Shenzhen (CN); Shi Tang, Shenzhen (CN); Jun Pan, Shenzhen (CN); Zhijian Sun, Shenzhen (CN); Hua Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 13/927,891

(22) Filed: Jun. 26, 2013

(65) Prior Publication Data

US 2013/0286854 A1    Oct. 31, 2013

Related U.S. Application Data

(63) Continuation of application No. PCT/CN2011/077976, filed on Aug. 3, 2011.

(30) Foreign Application Priority Data

Dec. 30, 2010  (CN) .......................... 2010 1 0615708

(51) Int. Cl.
*H04L 12/24* (2006.01)
*H04L 29/12* (2006.01)

(52) U.S. Cl.
CPC .......... *H04L 41/0645* (2013.01); *H04L 61/103* (2013.01); *H04L 61/2046* (2013.01); *H04L 61/2069* (2013.01)

(58) Field of Classification Search
None
See application file for complete search history.

(56) References Cited

U.S. PATENT DOCUMENTS

| | | | |
|---|---|---|---|
| 5,724,510 A * | 3/1998 | Arndt et al. | 709/220 |
| 6,456,597 B1 * | 9/2002 | Bare | 370/252 |

(Continued)

FOREIGN PATENT DOCUMENTS

| | | |
|---|---|---|
| CN | 1419386 A | 5/2003 |
| CN | 1466320 A | 1/2004 |

(Continued)

OTHER PUBLICATIONS

Cheshire, S., "IPv4 Address Conflict Detection," Memo, Network Working Group, Apple Inc. (Jul. 2008).

(Continued)

*Primary Examiner* — Candal Elpenord
(74) *Attorney, Agent, or Firm* — Leydig, Voit & Mayer, Ltd.

(57) ABSTRACT

The present invention discloses a method and network device for detecting IP address conflict. The method for detecting IP address conflict comprises: collecting all the ARP entries from a broadcasting network segment; and carrying out a data check on the ARP entries collected, and determining that there is an IP address conflicted when it is detected that there are ARP entries with the same IP address but different media access control (MAC) addresses. The network device includes a collecting module and a detecting module. The present invention may achieve the function of IP address conflict detection in a broadcasting network segment by employing one or several network devices and uses the ARP flexibly. The outer appearance of the ARP protocol is not changed, and the other devices in the broadcast network segment do not need to modify the protocol or provide special function support.

12 Claims, 3 Drawing Sheets

(56) References Cited

U.S. PATENT DOCUMENTS

| | | | |
|---|---|---|---|
| 7,200,649 B1* | 4/2007 | Batke et al. | 709/222 |
| 2001/0017857 A1 | 8/2001 | Matsukawa | |
| 2002/0052972 A1* | 5/2002 | Yim | 709/245 |
| 2004/0141511 A1* | 7/2004 | Rune et al. | 370/401 |
| 2005/0198242 A1 | 9/2005 | Kim | |
| 2006/0088037 A1 | 4/2006 | Finley et al. | |
| 2009/0006585 A1* | 1/2009 | Chen | 709/220 |
| 2009/0006635 A1* | 1/2009 | Siegmund | 709/228 |

FOREIGN PATENT DOCUMENTS

| | | |
|---|---|---|
| CN | 1499791 A | 5/2004 |
| CN | 1764129 A | 4/2006 |
| CN | 1798060 A | 7/2006 |
| CN | 101521658 A | 9/2009 |
| CN | 101674306 A | 3/2010 |
| CN | 101771732 A | 7/2010 |
| EP | 1742425 A2 | 1/2007 |

OTHER PUBLICATIONS

Written Opinion of the International Searching Authority in corresponding PCT Patent Application No. PCT/CN2011/077976 (Nov. 10, 2011).

International Search Report in corresponding PCT Patent Application No. PCT/CN2011/077976 (Nov. 10, 2011).

* cited by examiner

METHOD AND NETWORK DEVICE FOR DETECTING IP ADDRESS CONFLICT

CROSS-REFERENCE TO RELATED APPLICATIONS

This application is a continuation of International Patent Application No. PCT/CN2011/077976, filed on Aug. 3, 2011, which claims priority to Chinese Patent Application No. 201010615708.X, filed on Dec. 30, 2010, both of which are hereby incorporated by reference in their entireties.

FIELD OF INVENTION

The present invention relates to communication technologies, and particularly, to a method and network device for detecting IP address conflict.

BACKGROUND OF THE INVENTION

In one broadcasting network segment of the Ethernet, the configuration conflict of IP (Internet Protocol, internet protocol) address will cause an abnormal communication in the network segment, so that the conflicting and conflicted parts both cannot communicate normally. In the prior art, ARP (Address Resolution Protocol, address resolution protocol) is usually used through the following ways to detect conflict.

An owner of an IP address sends ARP request message periodically to the broadcasting network segment. If the owner of the IP address receives an ARP answer message, it means that a network device which has the same IP address as the owner's exists in the broadcasting network segment, and an IP address conflict is confirmed. If the owner of IP address receives an ARP request message whose Sender IP address is same as the IP address of the owner while whose Sender MAC (Media Access Control, media access control) is different from the MAC address of the owner, it means that a network device which has the same IP address as owner's exists in the broadcasting network segment, and thereby an alarm is generated.

However, in the above prior art, the owner of the IP address must send ARP request message actively. In present, most of the network devices do not support to send ARP request message actively. Moreover, an IP address conflict detection also requires the network device to support the detection of the IP address and MAC address of the received ARP request message. However, in present, most of the network devices either discard or do not detect the ARP request message.

SUMMARY OF THE INVENTION

A method for detecting IP address conflict is provided in embodiments of the present invention to achieve an IP address conflict detection under the situation that it is not needed for each network device to have the capability of sending ARP request message actively or detecting an address of the received ARP request message. The method comprises:

collecting all the ARP entries in a broadcasting network segment;

carrying out a data check on the ARP entries collected, and determining that there is an IP address conflicted when it is detected that there are ARP entries with the same IP address but different MAC addresses.

A network device is also provided in the embodiments of the present invention, to achieve an IP address conflict detection under the situation that it is not needed for each network device to have the capability of sending ARP request message actively or detecting an address of the received ARP request message. The device comprises:

a collecting module for collecting all the address resolution protocol ARP entries in a broadcasting network segment;

a detecting module for carrying out a data check on the ARP entries collected, and determining that there is an IP address conflicted when it is detected that there are ARP entries with the same IP address but different MAC addresses.

In the embodiments of the present invention, the function of an IP address conflict detection in a broadcasting network segment may be achieved by employing one or several network devices and the ARP protocol is used flexibly through carrying out a data check on the ARP entries collected, and it is determined that there is an IP address conflicted when it is detected that there are ARP entries with the same IP address but different MAC addresses. The outer appearance of the ARP protocol is not changed, and the other devices in the broadcast network segment do not need to modify the protocol or provide special function support.

BRIEF DESCRIPTION OF THE DRAWINGS

To illustrate the technical solution of the embodiments of the present invention more clearly, a brief introduction of the accompanying drawings which are needed in the description of the embodiments is given below. Apparently, the accompanying drawings in the description below is merely some of the embodiments of the present invention, based on which other drawings can be obtained by the skilled in the art without any creative effort.

EMBODIMENTS OF THE INVENTION

To make objectives, technical solutions and advantages of the present invention clearer, a detailed description of the embodiments of the present invention will be given below in connection with the accompanying drawings. Herein, the schematic embodiments of the present invention and corresponding description are used for explaining the present invention, but not used as a limitation to the present invention.

Figure 1:
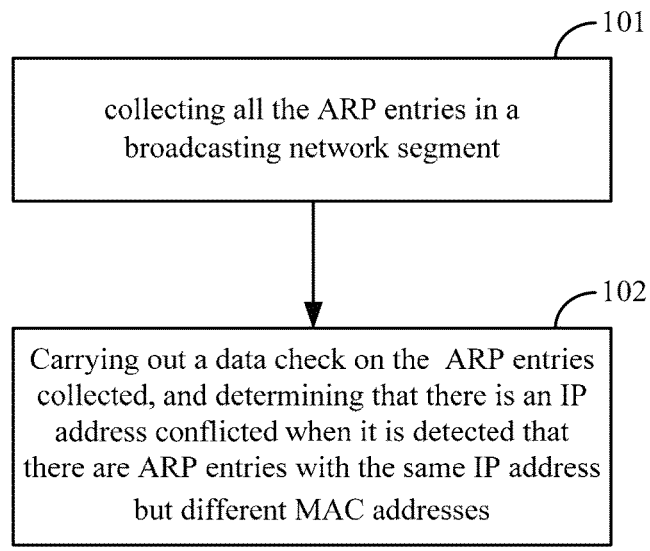
FIG. 1 is a process flowchart of a method for detecting IP address conflict according to the embodiments of the present invention.

As stated above, in a broadcasting network segment, each network device can achieve the IP address conflict detection between itself and other devices in the broadcasting network segment through ARP. However, the IP address conflict detection depends on the situation that each network device is capable of sending ARP request message actively or detecting the addresses of the received ARP request message, which is hard to be executed in the existing network application. For this reason, a method for detecting IP address conflict is provided in the embodiments of the present invention to detect the IP address conflict in a broadcasting network segment without each network apparatus in the broadcasting network segment providing the support of the particular abilities described above. As shown in FIG. 1, the detailed flowchart may comprise:

Step 101, collecting all the ARP entries in a broadcasting network segment;

Step 102, carrying out a data check on the ARP entries collected, and determining that there is an IP address conflicted when it is detected that there are ARP entries with the same IP address but different MAC addresses. Specially, if there are at least two ARP entries which have the same IP address but different MAC addresses in the ARP entries collected, it is determined that there is an IP address conflicted between the at least two ARP entries.

In an embodiment, all the entries in the broadcasting network segment can be collected to form a universal set of the ARP entries. And a data check is carried out in the set in real time to detect whether there are ARP entries in the IP address conflicted, i.e. ARP entries in the same IP address but different MAC addresses. When the IP address conflicted is found, a conflict set can be formed with the conflicted ARP entries.

The flowchart shown in FIG. 1 can be executed by the network devices which are able to realize the functions, such as a network device (three-layer device or monitoring interface) in a broadcasting network segment, the network devices are specially used for detecting the IP address conflict in the broadcasting network segment and other devices in the broadcasting network segment are not required to provide support to the particular abilities. The network devices can be selected through configuration and the number of the network devices may be one or several. In the case of several devices, a host-standby failure switching mechanism can be introduced. For example, several network devices disposed in the broadcasting network segment can execute the flowchart of collecting ARP entries and detecting IP address conflict as shown in FIG. 1, these several network devices include one host device and several standby devices. When the host device fails, some standby device can be switched to collect ARP entries and detect IP address conflict. Optionally, in the case that there are several devices in the broadcasting network segment, the flowchart shown in FIG. 1 can be executed by a plurality of devices, for example, Step 101 is executed by one device, and Step 102 is executed by another device.

Since one of the network devices in a broadcasting network segment needs to learn the MAC addresses of others by ARP protocol during communicating with the others, thus it cannot obtain the ARP entries of the others when there is no need for communication between them. That is to say, the network devices for detecting IP address conflict, which are used to execute the flowchart shown in FIG. 1, may not be able to learn all the ARP entries in the broadcasting network segment, as only the network devices in communication relations can learn the ARP entries of each other. In order to achieve the objective of learning all the ARP entries in the broadcasting network segment, a flexible extended ARP protocol is provided in the following for heuristic ARP learning to collect the specific instances of all the ARP entries in the broadcasting network.

In the present embodiment, the step of collecting all the entries in the broadcasting network segment can comprise: receiving an ARP request message in the broadcasting network segment; when a local IP address is different from a destination IP address in the ARP request message received: learning the ARP entry corresponding to a source IP address in the ARP request message received, if the ARP entry corresponding to the source IP address of the ARP request message received is not collected; learning the ARP entry corresponding to the destination IP address in the ARP request message received, if the ARP entry corresponding to the destination IP address of the ARP request message received is not collected. Namely, during a process that a network device for detecting IP address conflict is receiving the ARP request message in the broadcasting network segment, if the network device finds that the destination IP address (abbreviated as DIP) in the message is not its own, then searches for the locally collected ARP entries. If the network device does not find the ARP entry corresponding to the source IP address (abbreviated as SIP) in the message, then learn the ARP entry corresponding to the SIP actively, the active learn involves in forming ARP entry with the SIP and the source MAC address (abbreviated as SMAC) in the message; if the network device does not find an ARP entry corresponding to the collected DIP, then triggers an ARP learning process.

The example of the ARP learning process is as follows: the learning can be executed by treating the destination IP address in the ARP request message received as the destination IP address, the local IP address as SIP address, and the local MAC address as SMAC. Namely, the step of learning the ARP entry comprises sending an ARP request message, a destination IP address in the ARP request message sent is the destination IP address in the ARP request message received, the source IP address in the ARP request message sent is the local IP address, a source MAC address in the ARP request message sent is a local MAC address; and receiving an ARP answer message, and obtaining the ARP entries corresponding to the destination IP address in the ARP request message received according to the ARP answer message received.

Through the heuristic ARP learning in the present embodiment, all the ARP entries in the broadcasting network segment can be learned by the network device for detecting IP address conflict, if only there are network devices in communication relation in the broadcasting network segment. Therefore, the basic requirement of detecting IP address conflict by all the ARP entries in the broadcasting network segment is achieved. Meantime, the embodiment does not involve special changes to other network devices, and requires few changes to the devices in the present network.

In an embodiment, the collection of all the ARP entries in the broadcasting network segment may be implemented in many ways. For example, all the ARP entries in the broadcasting network segment can be learned through active scanning learning, which comprises: determining a range of the IP addresses in the broadcasting network segment according to the network number of the local IP address; sending an ARP request message in the broadcasting network segment by taking one of the IP addresses in the range as a destination IP address; receiving an ARP answer message; and learning the ARP entries corresponding to the corresponding IP address of the ARP answer message received.

The network device for detecting IP address conflict can determine a range of the IP addresses in the broadcasting network segment according to the network number of the own IP address. For example, the IP address of a L3 interface is 12.1.1.1/24, then the potential range of the IP addresses is 12.1.1.2~12.1.1.255, totaling 254 IP addresses. By taking one of the IP addresses in the above range as a destination IP address, the L3 interface sends an ARP request message in the broadcasting network segment. The ARP request message can be sent periodically, or sent in a certain order of the IP addresses, for example, from 12.1.1.2, 12.1.1.3 to 12.1.1.255. The ARP request message will be answered if the network device of certain IP address exists in the broadcasting network segment, and the L3 interface will not receive the corresponding the ARP answer message if the network device of certain IP address does not exist in the broadcasting network segment.

Though the method for learning all the ARP entries in the broadcasting network segment in an active scanning manner, it is ensured that the network device for detecting IP address can learn all the ARP entries in the broadcasting network segment. The embodiment does not involve special changes to other network devices, and requires few changes to the devices in the present network.

In order to prevent the occurrence of detection error or false entries generated by ARP cheating, the validity of the results of conflict detection in the flowchart as shown in FIG. 1 can be further confirmed. The way of confirmation can comprise: sending an ARP request message in the broadcasting network segment by taking the IP address conflicted as the destination IP address; and carrying out a conflict confirmation on the IP address conflicted if more than one ARP answer messages are received. Specifically, after it is determined that there is an IP address conflicted during the data check, the ARP request message which takes the destination IP address as an IP address conflicted is sent in the broadcasting network segment. If more than one ARP answer messages is received, which means that there is an IP address conflicted in the broadcasting network segment, thus the conflict is confirmed.

Figure 2:
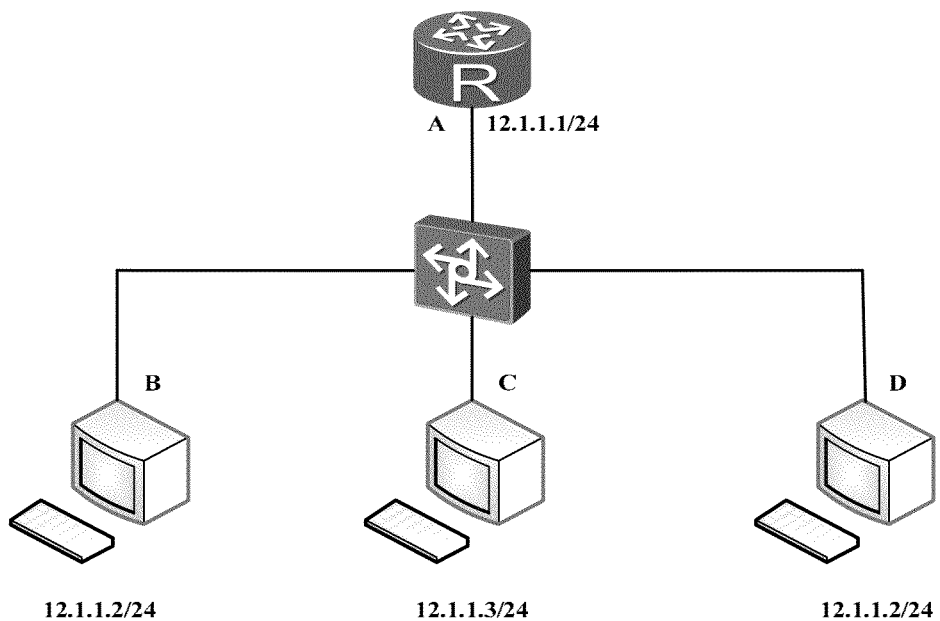
FIG. 2 is a process flowchart of a method for carrying out conflict confirmation according to the embodiments of the present invention.

FIG. 2 shows another example. Interface A is responsible for monitoring whether there is an IP address conflicted in the broadcasting network segment 12.1.1.0/24. The interface A collects all the ARP entries in the broadcasting network segment. When the IP address conflicted between the ARP entry of apparatus D (12.1.1.2/24, MAC_D) and the ARP entry of apparatus B (12.1.1.2/24, MAC_B) is found, then the conflict set may be generated. Then, the interface A sends a ARP request message whose Destination IP is 12.1.1.2 in the broadcasting network segment. When the device B and the device D receive the ARP request message, ARP answer messages will be returned according to the requirement of ARP protocol. As a result, the interface A receives two ARP answer messages, and the conflict is judged valid.

In an embodiment, after the IP address conflict is determined by the data check, the IP addresses conflicted can be alarmed. For example, the above confirmed IP addresses conflicted are alarmed.

After the IP address conflicted is alarmed, the method further comprises: sending an ARP request message in the broadcasting network segment by taking the IP address conflicted as a destination IP address; and carrying out a conflict resolution confirmation on the IP address conflicted and de-alarming the IP address conflicted, if only one ARP answer message is received or no ARP answer message is received.

Based on the same inventive conception, a network device is provided in the embodiments of the present invention, as mentioned in the following examples. Since the network device corresponds to the method for detecting IP address conflict, the network device can refer to the example of the method for detecting IP address conflict.

Figure 3:
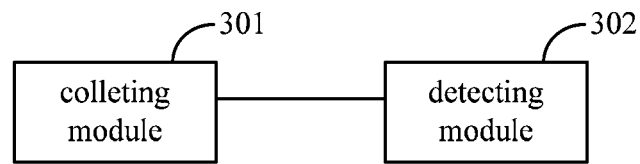
FIG. 3 is a schematic drawing of the structure of a network device according to the embodiments of the present invention.

As shown in FIG. 3, the network device in an embodiment of the present invention may comprise:

a collecting module 301 for collecting all the ARP entries in a broadcasting network segment; and a detecting module 302 for carrying out a data check on the ARP entries collected, and determining that there is an IP address conflicted when it is detected that there are ARP entries with the same IP address but different media access control MAC addresses.

Figure 4:
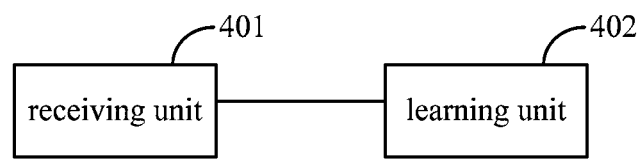
FIG. 4 is a schematic drawing of the structure of a specific embodiment of a collecting module according to the embodiments of the present invention.

As shown in FIG. 4, in the following embodiment, the collecting module 301 may comprise:

a receiving unit 401 for receiving an ARP request message in the broadcasting network segment; and a learning unit 402 for when a local IP address is different from a destination IP address in the ARP request message received: learning the ARP entry corresponding to a source IP address in the ARP request message received, if the ARP entry corresponding to the source IP address of the ARP request message received is not collected; learning the ARP entry corresponding to the destination IP address in the ARP request message received, if the ARP entry corresponding to the destination IP address of the ARP request message received is not collected.

In an embodiment, the learning module 402 may be specifically used for:

sending an ARP request message, wherein a destination IP address in the ARP request message sent is the destination IP address in the ARP request message received; the source IP address in the ARP request message sent is a local IP address; a source MAC address in the ARP request message sent is a local MAC address; and receiving an ARP answer message, and obtaining the ARP entries corresponding to the destination IP address in the ARP request message received according to the ARP answer message received.

Figure 5:
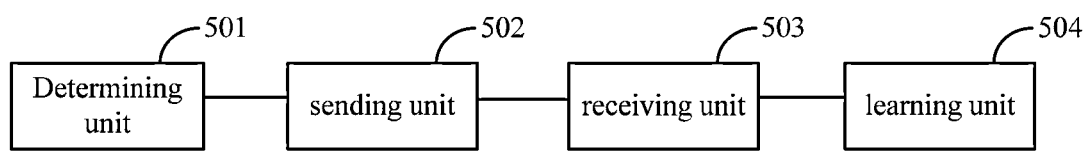
FIG. 5 is a schematic drawing of the structure of another specific embodiment of a collecting module according to the embodiments of the present invention.

In an embodiment as shown in FIG. 5, the collecting module 301 may comprise:

a determining unit 501, for determining a range of the IP addresses in the broadcasting network segment according to the network number of the local IP address;

a sending unit 502, for sending an ARP request message in the broadcasting network segment by taking one of the IP addresses in the range as a destination IP address;

a receiving unit 503, for receiving an ARP answer message; and a learning unit 504, for learning the ARP entries corresponding to the corresponding IP address of the ARP answer message received.

Figure 6:
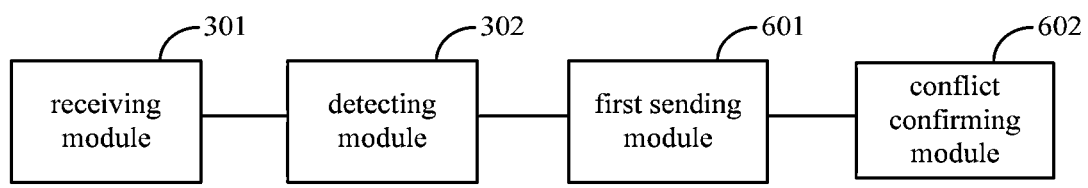
FIG. 6 is a schematic drawing of the structure of a specific embodiment of a network device according to the embodiments of the present invention.

In an embodiment as shown in FIG. 6, the network device shown in FIG. 3 may further comprise:

a first sending module 601, for sending an ARP request message in the broadcasting network segment by taking the IP address conflicted as the destination IP address; and a conflict confirming module 602, for carrying out a conflict confirmation on the IP address conflicted if more than one ARP answer messages are received.

Figure 7:
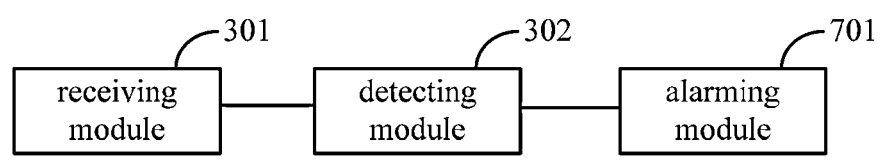
FIG. 7 is a schematic drawing of the structure of another specific embodiment of a network device according to the embodiments of the present invention.

In an embodiment as shown in FIG. 7, the network device shown in FIG. 3 may further comprise:

an alarming module 701, for alarming the IP address conflicted after the detecting module 302 determines there is an IP address conflicted.

Figure 8:
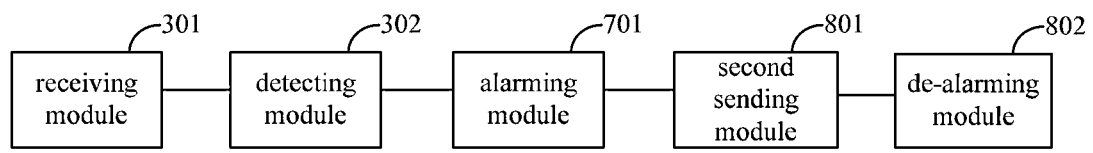
FIG. 8 is a schematic drawing of the structure of another specific embodiment of a network device according to the embodiments of the present invention.

In an embodiment as shown in FIG. 8, the network device shown in FIG. 7 may further comprise:

a second sending module 801, for sending an ARP request message in the broadcasting network segment by taking the IP address conflicted as a destination IP address after the alarming module 701 alarms the IP address conflicted;

a de-alarming module 802, for carrying out a conflict resolution confirmation on the IP address conflicted and de-alarming the IP address conflicted, if only one ARP answer message is received or no ARP answer message is received.

In summary, in the embodiments of the present invention, it may be achieved the function of IP address conflict detection in a broadcasting network segment by employing one or several network devices and the ARP protocol is used flexibly through carrying out a data check on the ARP entries collected, and it is determined that there is an IP address conflicted when it is detected that there are ARP entries with the same IP address but different MAC addresses. The outer appearance of the ARP protocol is not changed, and the other devices in the broadcast network segment do not need to modify the protocol or provide special function support.

Those skilled in the art should understand that a method, a system or a computer program product can be provided in the embodiments of the present invention. Therefore, the present invention can adopt the following forms of embodiments: only using hardware; only using software; or combining the hardware and software. And, the present invention can adopt the form of a computer program product, which is executed on one or more than one computer available memory mediums (including but not limited to disk memory, CD-ROM, optical memory and so on) including computer available program code.

The present invention is described by referring to the flowcharts and/or diagrams of the methods, equipments (systems) and products of computer program according to the embodiments of the present invention. It is to be appreciated that each flowchart and/or each diagram of the flowchart figures and/or diagram figures and the combination of the flowcharts and/or diagrams of the flowchart figures and/or diagram figures can be realized by instructing the computer program. These instructions of the computer program can be provided to general computers, specialized computers, embedded computers or other processors of programmable data processing equipments to generate a machine, so that a device is generated to realize the designated functions in one or more than one flowcharts in a flowchart figure or one or more than one diagrams in a diagram figure.

These computer program instructions can also be stored in the computer readable memory which can introduce computers or other programmable data processing equipments to work in a special mode, so that the instructions stored in the computer readable memory generate manufacture including an instruction unit. The instruction unit realizes the functions designated in one or more than one flowcharts in a flowchart figure or in one or more than one diagrams in a diagram figure.

These computer program instructions can be loaded to computers or other programmable data processing equipments, so that a series of operating steps are executed on the computers or other programmable equipments to generate the process realized in a computer, and thereby the steps for realizing designated functions in one or more than one flowcharts in a flowchart figure or one or more than one diagrams in a diagram figure are provided in the computers or other programmable equipments.

The specific embodiments described above give a further illustration of the objective, technical solution and beneficial effects of the present invention. It is to be appreciated that, the content described above is just the embodiments of the present invention, which is not used to give a limitation to the scope of the protection. Any modification, equivalent replacement, improvement in the spirits and principles of the present invention should be included in the scope of the protection of the present invention.

What is claimed is:

1. A method for detecting Internet Protocol (IP) address conflict, comprising:
   collecting all address resolution protocol (ARP) entries in a broadcasting network segment; and
   carrying out a data check on the ARP entries collected, and determining there is an IP address conflicted when it is detected that there are ARP entries with a same IP address but different media access control (MAC) addresses;
   wherein the collecting all the ARP entries in the broadcasting network segment comprises:
   receiving an ARP request message in the broadcasting network segment; and
   when a local IP address is different from a destination IP address in the ARP request message received:
   learning a ARP entry corresponding to a source IP address in the ARP request message received, if the ARP entry corresponding to the source IP address of the ARP request message received is not collected;
   learning a ARP entry corresponding to the destination IP address in the ARP request message received, if the ARP entry corresponding to the destination IP address of the ARP request message received is not collected.

2. The method according to claim 1, wherein after determining there is an IP address conflicted, further comprises the steps of:
   sending a second ARP request message in the broadcasting network segment by taking the IP address conflicted as a destination IP address; and
   carrying out a conflict confirmation on the IP address conflicted if more than one ARP answer messages are received.

3. The method according to claim 1, wherein learning the ARP entry corresponding to the destination IP address in the ARP request message received comprises:
   sending a second ARP request message, wherein a destination IP address in the second ARP request message is the destination IP address in the ARP request message received; a source IP address in the second ARP request message is the local IP address; a source MAC address in the second ARP request message is a local MAC address; and
   receiving an ARP answer message, and obtaining the ARP entries corresponding to the destination IP address in the ARP request message received according to the ARP answer message received.

4. The method according to claim 3, wherein after determining there is an IP address conflicted, further comprises the steps of:
   sending a third ARP request message in the broadcasting network segment by taking the IP address conflicted as the destination IP address; and
   carrying out a conflict confirmation on the IP address conflicted if more than one ARP answer messages are received.

5. The method according to claim 1, wherein after determining there is an IP address conflicted, further comprises the step of:
   alarming the IP address conflicted.

6. The method according to claim 5, wherein after alarming the IP address conflicted, further comprises the steps of:
   sending a second ARP request message in the broadcasting network segment by taking the IP address conflicted as a destination IP address; and
   carrying out a conflict resolution confirmation on the IP address conflicted and de-alarming the IP address conflicted, if only one ARP answer message is received or no ARP answer message is received.

7. A network device, comprising:
a processor coupled to a memory, the processor configured to:
collect all address resolution protocol (ARP) entries in a broadcasting network segment;
carry out a data check on the ARP entries collected,
determine there is an Internet Protocol (IP) address conflicted when it is detected that there are ARP entries with a same IP address but different media access control (MAC) addresses; and
receive an ARP request message in the broadcasting network segment; and
wherein when a local IP address is different from a destination IP address in the ARP request message received: the processor is further configured to learn the ARP entry corresponding to a source IP address in the ARP request message received, if the ARP entry corresponding to the source IP address of the ARP request message received is not collected; configured to learn the ARP entry corresponding to the destination IP address in the ARP request message received, if the ARP entry corresponding to the destination IP address of the ARP request message received is not collected.

8. The device according to claim 7, wherein the processor is further configured to:
send a second ARP request message in the broadcasting network segment by taking the IP address conflicted as the destination IP address; and
carry out a conflict confirmation on the IP address conflicted if more than one ARP answer messages are received.

9. The device according to claim 7, wherein the processor is configured to:
send a second ARP request message, wherein a destination IP address in the second ARP request message is the destination IP address in the ARP request message received; the source IP address in the second ARP request message is a local IP address; a source MAC address in the second ARP request message is a local MAC address; and
receive an ARP answer message, and obtaining the ARP entries corresponding to the destination IP address in the ARP request message received according to the ARP answer message received.

10. The device according to claim 9, wherein the processor is further configured to:
send an ARP request message in the broadcasting network segment by taking the IP address conflicted as the destination IP address; and
carry out a conflict confirmation on the IP address conflicted if more than one ARP answer messages are received.

11. The device according to claim 7, further configured to alarm the IP address conflicted.

12. The device according to claim 11, wherein the processor is further configured to:
send a second ARP request message in the broadcasting network segment by taking the IP address conflicted as a destination IP address; and
carry out a conflict resolution confirmation on the IP address conflicted and to de-alarm the IP address conflicted, if only one ARP answer message is received or no ARP answer message is received.

* * * * *